United States Patent
Oh et al.

(10) Patent No.: US 10,003,674 B1
(45) Date of Patent: Jun. 19, 2018

(54) METHOD FOR SUPPORTING WEBSOCKET AND WEB SERVER AND WEB APPLICATION SERVER USING THE SAME

(71) Applicant: TMAXSOFT. CO., LTD., Gyeonggi-do (KR)

(72) Inventors: Hyun Seok Oh, Seoul (KR); Young Hwi Jang, Seoul (KR)

(73) Assignee: TMAXSOFT.CO., LTD., Gyeonggi-do (KR)

( * ) Notice: Subject to any disclaimer, the term of this patent is extended or adjusted under 35 U.S.C. 154(b) by 0 days. days.

(21) Appl. No.: 15/655,677

(22) Filed: Jul. 20, 2017

(30) Foreign Application Priority Data

Jul. 7, 2017 (KR) .................. 10-2017-0086454

(51) Int. Cl.
*G06F 15/16* (2006.01)
*H04L 29/06* (2006.01)
*H04L 29/08* (2006.01)

(52) U.S. Cl.
CPC .......... *H04L 67/42* (2013.01); *H04L 65/1063* (2013.01); *H04L 67/02* (2013.01); *H04L 67/32* (2013.01)

(58) Field of Classification Search
CPC ......... H04L 67/42; H04L 67/02; H04L 67/32; H04L 65/1063

USPC .......................................... 709/203
See application file for complete search history.

(56) References Cited

U.S. PATENT DOCUMENTS

| 6,665,721 | B1 * | 12/2003 | Hind | H04L 29/06 370/252 |
| 8,775,603 | B2 * | 7/2014 | Hansen | G06Q 30/02 705/4 |
| 2014/0109041 | A1 * | 4/2014 | Yunten | G06F 8/34 717/109 |

* cited by examiner

*Primary Examiner* — Tauqir Hussain
(74) *Attorney, Agent, or Firm* — Husch Blackwell LLP

(57) ABSTRACT

A web server includes a communication unit for receiving or transmitting a message corresponding to the request message which has been processed as a WebSocket message from or to at least one of clients and WAS. A processor, after finishing a WebSocket upgrade, (a) instructs the communication unit to send, to a specific worker thread of the WAS via predetermined internal protocol, the request message which has been processed as the WebSocket message by using a specific connection among a plurality of connections established by a reverse connection scheme for interaction between the web server and the WAS; and (b) receives the response message corresponding to the request message from the specific worker thread via the internal protocol by using the specific connection. The reverse connection scheme establishes at least one connection between the web server and the WAS by the WAS sending a request to the web server.

15 Claims, 6 Drawing Sheets

METHOD FOR SUPPORTING WEBSOCKET AND WEB SERVER AND WEB APPLICATION SERVER USING THE SAME

CROSS REFERENCE TO RELATED APPLICATION

This application claims priority to and incorporates herein by reference all disclosure in Korean Patent Application No. 10-2017-0086454 filed Jul. 7, 2017.

FIELD OF THE INVENTION

The present invention relates to a method for supporting WebSocket protocol for connections between a web application server (WAS) and a web server, and the WAS and the web server using the same. More specifically, the present invention relates to a method including the steps of (a) a web server sending to a specific worker thread of the WAS via predetermined internal protocol a request message which has been processed as a WebSocket message, if the request message is obtained from at least one of clients after finishing a WebSocket upgrade, by using a specific connection among a plurality of connections established by a reverse connection scheme for interaction between the web server and the WAS, wherein the reverse connection scheme establishes at least one connection between the web server and the WAS by the WAS sending a request to the web server; and (b) the web server receiving a response message corresponding to the request message from the specific worker thread via the specific connection, and the WAS and the web server using the same.

BACKGROUND OF THE INVENTION

A web server receives an HTTP (Hyper-Text Transfer Protocol) request from an entity (i.e., a client) requesting World Wide Web (hereinafter referred to as "Web") services to the web server, and provides a response, e.g., a web page, to the HTTP request, to the client. In addition, a web application server, i.e., WAS, is a software engine, running web applications for the client via HTTP protocol on a network, or a hardware including the software engine.

In general, to process WebSocket connection between the web server and the WAS, the web server and the WAS may be connected and working in a reverse proxy mode. In this case, the web server only serves as a tunnel to simply pass WebSocket messages from the client to the WAS without checking the WebSocket messages.

For a reference, a reverse proxy used in the reverse proxy mode may be a kind of proxy server that retrieves resources from one or more servers in an intranet, for example, the proxy server receives requests from Internet and forwards the requests to other servers in the intranet.

However, a problem may appear when the reverse proxy mode is adopted. In detail, under a circumstance that each of clients using WebSocket and the proxy server has each corresponding connection, the number of the connection in the reverse proxy mode increases as the number of the clients increments. For example, on condition that a first client is in a state of being connected to the proxy server via one of connections established under reverse proxy mode, namely a first connection, if a second client intends to send a WebSocket request message, the second client has to make another connection, referred to as a second connection. In detail, the first connection cannot be utilized to forward and receive the WebSocket request message of the second client. Thus, as the number of the clients sending the request message increases, the number of the connection increments. Consequently, a problem with a waste of the number of the connection occurs under an environment that the web server and the WAS are connected via the existing connections established by the reverse proxy mode.

Also, another problem may arise under the same circumstance. In detail, due to a context switching incurred at the WAS, a function of the WAS switches from a selector mode to a worker mode, resulting in an inefficient execution of the function at the WAS. For example, in WAS, the context switching may occur to perform to be in the selector mode while performing in the worker mode on the condition that the WAS receives a predetermined request message from the web server. Hence, the context switching problem which contributes to the inefficacy of the operation of the WAS exists.

Besides, still another problem with improper load balancing exists under the environment as mentioned above and additionally under such an environment as configurations of the WAS changes dynamically, like in a cloud computing context. For example, in case of adding one new WAS into a group of two operating WASs on the condition that load status of the two WASs in use are already heavy, a problem may arise with a web server which applies a round robin approach to each WAS due to the fact that request messages from new clients, even if the new WAS is added into the group, may not be delivered to the two WASs through the existing connections, and thus proper load balancing cannot be achieved.

Therefore, in order to (i) avoid the problem of wasting the number of the connections between the web server and the WAS established by the reverse proxy mode, (ii) avert the problem of inefficient performance of the functions of the WAS due to the context switching, (iii) prevent the overload of the WASs, and (iv) implement efficient load balancing, the applicant comes up with the present invention.

SUMMARY OF THE INVENTION

It is an object of the present invention to eliminate a waste of the number of connections between a web server and a WAS and to provide an environment in which no context switching is incurred at the WAS.

It is another object of the present invention to provide a method for efficiently managing connections between the web server and the WAS established by a reverse connection scheme with a WebSocket.

Also, it is still another object of the present invention to aim at an effective dynamic load balancing of the web server even in situations that configurations of WASs are dynamically changed like adding a new WAS to be interacted with the web server, and that the configurations of WASs are not changed.

In addition, it is still yet another object of the present invention to maintain a uniform degree of session load when several WASs process the same service through an effective load balancing.

In accordance with one aspect of the present invention, there is provided a web server including a communication unit for receiving or transmitting a request message or a response message corresponding to the request message which has been processed as a WebSocket message from or to at least one of clients and WAS; and a processor, after finishing a WebSocket upgrade, configured to execute the processes of (a) instructing the communication unit to send to a specific worker thread of the WAS via predetermined internal protocol the request message which has been processed as the WebSocket message by using a specific connection among a plurality of connections established by a reverse connection scheme for interaction between the web server and the WAS, wherein the reverse connection scheme establishes at least one connection between the web server and the WAS by the WAS sending a request to the web server; and of (b) receiving the response message corresponding to the request message from the specific worker thread via the internal protocol by using the specific connection.

In accordance with another aspect of the present invention, there is provided a web application server (WAS) including a communication unit for interacting with at least one web server; and a processor, after finishing a WebSocket upgrade, configured to execute the processes of (a) instructing the communication unit to receive from the web server via predetermined internal protocol a request message, which has been processed as a WebSocket message and which is from at least one of clients, by using at least one specific connection among a plurality of connections established by a reverse connection scheme for interaction between the web server and the WAS, wherein the reverse connection scheme establishes at least one connection between the web server and the WAS by the WAS sending a request to the web server; and of (b) instructing the communication unit to send to the web server via the internal protocol a response message corresponding to the request message, wherein the response message has been processed as a WebSocket message by at least one of specific worker threads of the WAS.

In accordance with still another aspect of the present invention, there is provided a method comprising the steps of: (a) a web server sending to a specific worker thread of the WAS via predetermined internal protocol a request message which has been processed as a WebSocket message, if the request message is obtained from at least one of clients after finishing a WebSocket upgrade, by using a specific connection among a plurality of connections established by a reverse connection scheme for interaction between the web server and the WAS, wherein the reverse connection scheme establishes at least one connection between the web server and the WAS by the WAS sending a request to the web server; and (b) the web server receiving a response message corresponding to the request message from the specific worker thread via the specific connection.

In accordance with still yet another aspect of the present invention, there is provided a method comprising the steps of: (a) a web application server (WAS), after finishing a WebSocket upgrade, receiving from at least one web server via predetermined internal protocol a request message which has been processed as a WebSocket message in the web server by using at least one specific connection among a plurality of connections established by a reverse connection scheme for interaction between the web server and the WAS, on the condition that the web server have received the request message from at least one of clients, wherein the reverse connection scheme establishes at least one connection between the web server and the WAS by the WAS sending a request to the web server; and (b) the WAS sending to the web server via the internal protocol a response message corresponding to the request message, wherein the response message has been processed as a WebSocket message by at least one of specific worker threads thereof.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
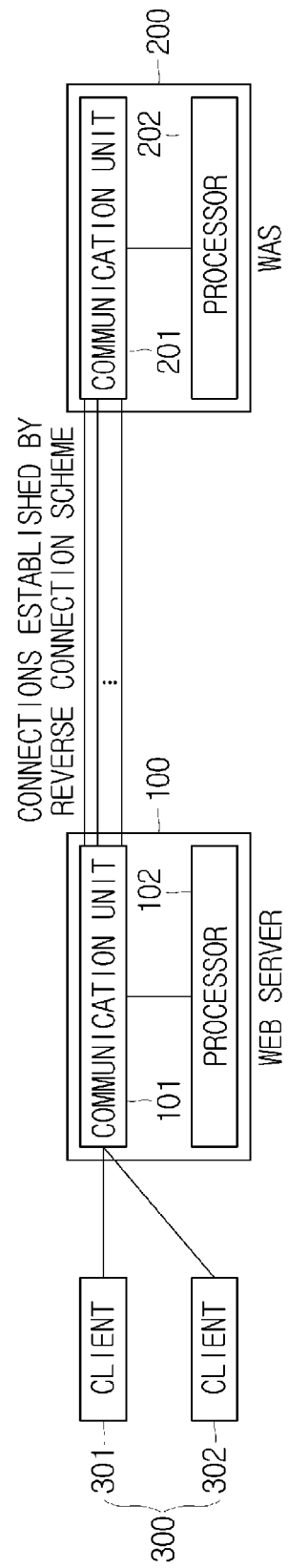
FIG. 1 is a block diagram schematically illustrating a web server, a WAS associated with the web server, and internal configurations thereof.

To make purposes, technical solutions, and advantages of the present invention clear, reference is made to the accompanying drawings that show, by way of illustration, more detailed example embodiments in which the invention may be practiced. These embodiments are described in sufficient detail to enable those skilled in the art to practice the invention.

It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Hereinafter, preferred embodiments of the present invention will be described in detail with reference to the accompanying drawings so that those skilled in the art can easily implement the present invention.

FIG. 1 is a block diagram schematically illustrating a web server, a WAS interacted with the web server, and internal configurations thereof.

Referring to FIG. 1, although only one WAS 200 is shown to be connected to one web server 100, FIG. 1 is merely an exemplary representation. For example, a plurality of web servers may be connected to one WAS 200, or a plurality of WASs may be connected to one web server 100.

Specifically, the web server 100 may include a communication unit 101 and a processor 102. The communication unit 101 of the web server 100 receives a request message from at least one of clients 300, i.e., 301 and/or 302, and may interact with a communication unit 201 of the WAS 200. And the processor 102 of the web server 100, as described below, may perform a process of supporting WebSocket when the web server 100 is interacting with the WAS 200 by a reverse connection scheme.

If the request message is obtained from the at least one of clients 300 through the communication unit 101 of the web server 100, the processor 102 of the web server 100 may perform a process of selecting a specific connection corresponding to a specific worker thread included in the WAS 200 for interaction between the web server 100 and the WAS 200 by the reverse connection scheme. Herein, the reverse connection scheme establishes at least one connection between the web server 100 and the WAS 200 by the WAS 200 sending a request to the web server 100. Methods for matching with the specific worker thread using the reverse connection scheme and selecting a specific connection among a plurality of connections established by the reverse connection scheme are described in detail below.

Also, after finishing WebSocket upgrade under an environment of the connections between the web server 100 and the WAS 200 established by the reverse connection scheme, the processor 102 of the web server 100 performs the function of sending to the WAS 200 a request message from the at least one of clients after processing the request message as a WebSocket message. Herein, the processor 102 executes a process of supporting a communication with the specific worker thread of the WAS 200 via predetermined internal protocol when the request message having been processed as the WebSocket message is sent to the WAS 200. The procedure of the WebSocket upgrade under the environment of the connections between the web server 100 and the WAS 200 established by the reverse connection scheme is described in detail below.

Figure 4:
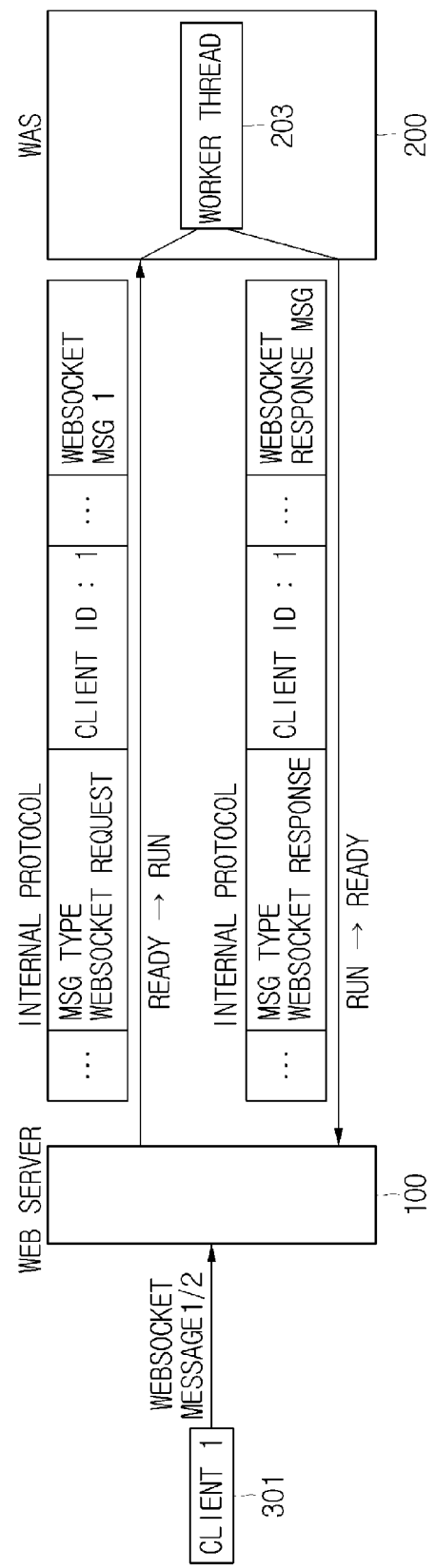
FIG. 4 is a conceptual diagram schematically illustrating states of reverse connections and internal protocol for transmitting WebSocket messages between the web server and the WAS.

The processor 102 of the web server 100 executes a process of receiving a response message corresponding to the request message via internal protocol from the specific worker thread, e.g., a reference number 203 in FIG. 4, of the WAS 200 by using the reverse connection scheme. Herein, the internal protocol may include WJP, i.e., WebtoB-JEUS Protocol, provided by Tmaxsoft, but it is not limited thereto.

Meanwhile, the WAS 200 may include a communication unit 201 and a processor 202. The communication unit 201 of the WAS 200 may interact with the communication unit 101 of the web server 100. And the processor 202 of the WAS 200 as described in detail below may execute a process of supporting WebSocket upon interacting with the web server 100 by the reverse connection scheme.

On the conditions that (i) WebSocket is used under a environment of connections established by the reverse connection scheme and (ii) a specific connection among the connections established by the reverse connection scheme is used to allow the web server 100 and the WAS 200 to be interacted, the processor 202 of the WAS 200 may execute a process of processing a response message corresponding to the request message obtained from the web server 100 as a WebSocket message and sending it to the web server 100 through the specific connection.

Figure 2:
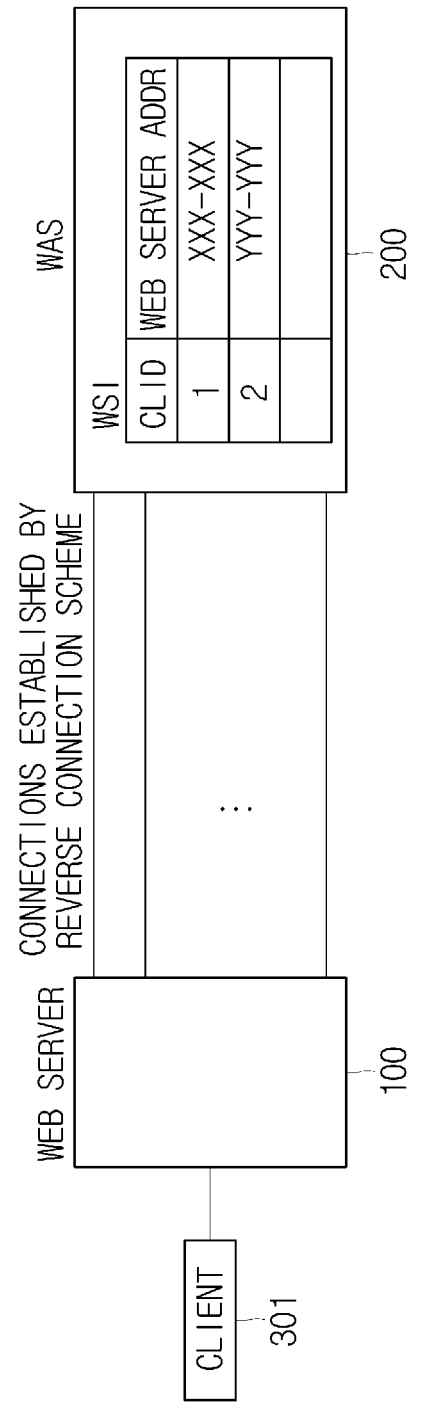
FIG. 2 is a block diagram schematically illustrating a connection configuration of an application on an endpoint in response to the request message from a client under an environment where the web server and the WAS are linked by a reverse connection scheme.

FIG. 2 is a block diagram schematically illustrating a connection configuration of an application on an endpoint in response to the request message of the client 301 under an environment where the web server 100 and the WAS 200 are linked by the reverse connection scheme.

Upon receiving the request message from the client 301, the web server 100 allows a selector thereof to select a specific connection capable of transmitting the request message by referring to a state of each connection established by the reverse connection scheme, and sends the request message to the WAS 200 via the specific connection.

As mentioned above, the reverse connection scheme is embodied by the WAS 200 sending a request message that asking for a connection to the web server 100. Further, each connection established by the reverse connection scheme corresponds to each worker thread in the WAS 200.

The connection has two states: ready and run. Once receiving the request message from the client 301, the web server 100 selects a specific connection with the ready state among the plurality of connections established by the reverse connection scheme and transmits the request message through the specific connection. Then, the request message is sent to the worker thread of the WAS 200 corresponding to the specific connection.

To be specifically, in case a response message corresponding to the request message is sent from the WAS 200 to the web server 100, the state of the specific connection may be set as ready. On the other hand, in case a response message corresponding to the request message has not yet been sent from the WAS 200 to the web server 100, the state of the specific connection may be set as run.

Herein, the web server 100 may select the specific connection among the connections with the ready state. Accordingly, it provides an effect of re-using the connections with the ready state among the connections established by the reverse connection scheme without a need for adding a new connection with the WAS 200 even if a request message is received from a new client.

In addition, even if a new WAS is added due to heavy loads of the WASs linked with the web server, the web server may not use a round robin approach for each WAS to process a new request message from the client, instead, it may select and use a connection with the ready state among the connections established by the reverse connection scheme. Thus, an effective load balancing is achieved. Herein, the minimum or the maximum number of the connections may be preset and each of the connections is not bound to clients unlike a connection in a reverse proxy mode.

On the other hand, in order to select the specific connection appropriately, the state of the connections should be clear. That is, since the web server 100 operates by referring to the state of the connections, the WAS 200 should transmit a message including response information corresponding to the request message in order to change the state of the specific connection. However, due to the characteristics of the WebSocket, there may be a request message which will not request the WAS 200 to send a corresponding response message. Thus, when the web server 100 sends such a request message, the WAS 200 may have to send the corresponding response message without the WebSocket message body to the web server 100 via the specific connection, resulting in a change of the state of the specific connection from run to ready.

Meanwhile, if a first response message corresponding to a first request message has not yet been received by the web server 100, a second request message with a lower priority than the first request message may be pended until the first response message corresponding to the first request message is received, in order to ensure ordering of the request messages from the clients.

On the other hand, the web server 100 and the WAS 200 linked by the reverse connection scheme send and receive messages via the predetermined internal protocol. Herein, a header of a message according to the internal protocol includes predetermined data section for the reverse connection scheme having information of a client. The internal protocol includes at least one or more of the following information: a message type, a client id, a message length, and a message payload. The information of the message payload may include WebSocket message body if it is the WebSocket message.

Referring to FIG. 2 again, the WAS 200 knows the information of the web server 100 and the information of the client connected to a specific application WS1 if the client 301 is connected to the specific application WS1 of the WAS 200. For example, the WAS 200 knows (i) the information on from which client a request message is sent by referring to a client ID whose corresponding client is connected to the specific application WS1 and (ii) information on from which web server the request message has been sent by referring to address information of the web server. Due to the fact that the web server 100 plays a role of the selector, the request message contains information of the client or the web server according to the internal protocol and appends the message body thereto. That is, in accordance with one example embodiment of the present invention, the WAS 200 merely plays a role of a worker and information sharing between the web server 100 and the WAS 200 is done by the internal protocol. As such, there is no need for the WAS 200 to alternatively switching between a function of the selector and that of the worker due to the fact that the WAS 200 merely plays a role of a worker, which gives an effect of an elimination of the context switching.

Figure 3:
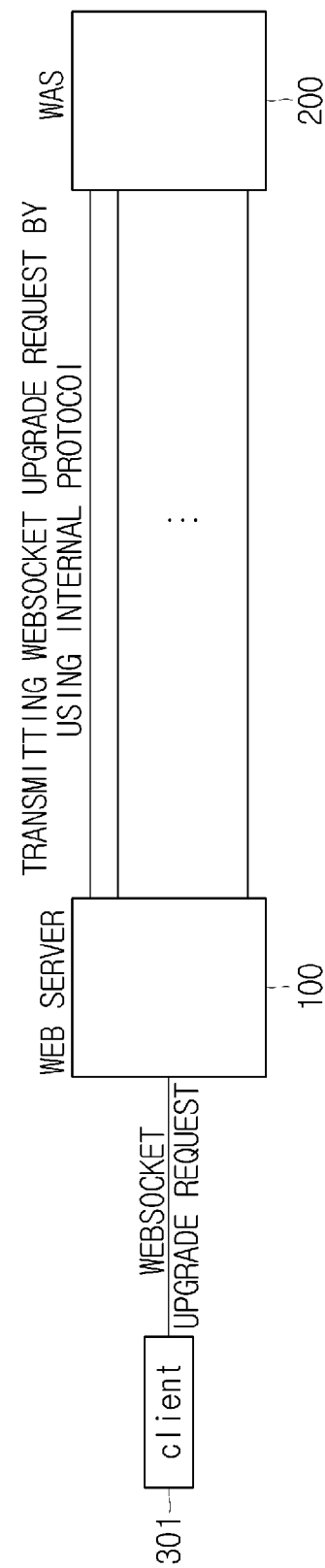
FIG. 3 is a conceptual diagram schematically illustrating a situation in which a WebSocket upgrade request is transmitted to the WAS after the client makes the WebSocket upgrade request.

FIG. 3 is a conceptual diagram schematically illustrating a situation in which the client 301 sends a WebSocket upgrade request to the WAS. Herein, a part of description disclosed below with a reference to FIG. 3 may precede the description of FIG. 1 and FIG. 2.

Referring to FIG. 3, the web server 100 determines whether or not to use the WebSocket through the handshake with the client 301, i.e. upgrade request. Upon receiving the WebSocket upgrade request from the client, the web server 100 sends a subsequent message corresponding to the WebSocket upgrade request to the WAS 200 via the internal protocol which contains the information on the client. Then, the WAS 200 sends the response message to the web server 100. If the web server 100 receives the response message indicating an acceptance of the WebSocket upgrade request, then the type of the client is set as the WebSocket and then the request message from the client is processed as the WebSocket message. Herein, the WAS 200 also has information on the client ID. Accordingly, upon receiving the request message transmitted from the client as the WebSocket message, the web server 100 processes the request message as the WebSocket message and sends it to the WAS 200 via the internal protocol. Then, the web server 100 receives from the WAS 200 the response message corresponding to the request message.

On the other hand, even if there is no upgrade request is sent to the web server 100 from any client, the WebSocket upgrade message may be generated by the processor 102 and then be sent to the WAS 200. Similarly, in such a case, upon receiving from the WAS 200 a response indicating the acceptance of the upgrade request, then the web server 100 sets the type of the client as the WebSocket and then the request message from the client is to be processed as the WebSocket message.

FIG. 4 is a conceptual diagram schematically illustrating states of connections established by the reverse connection scheme and the internal protocol for transmitting messages between the web server and the WAS in case of applying the WebSocket.

Referring to FIG. 4, if a WebSocket msg 1 and a WebSocket msg 2 have been sent from a client 301 to the web server 100, the web server 100 sends the WebSocket msg 1 to a worker thread 203 corresponding to the specific connection. Herein, the message type, i.e., a field in the internal protocol, is set as "WebSocket Request" by the internal protocol, and the internal protocol includes information on client ID and the WebSocket msg 1. If the web server 100 selects the specific connection with a state of "ready" and sends the WebSocket message to the WAS 200, then, the state of the specific connection is switched from ready to run.

And if a response message for the WebSocket msg 1 has not yet been received from the WAS 200, the state of the specific connection is still specified as "run" and the WebSocket msg 2 sent by the client 301 is pending at the web server side.

After the response message corresponding to the request message is delivered from the WAS 200 by using the internal protocol, the web server 100 changes the state of the specific connection from "run" to "ready". Herein, the message type is set as "WebSocket Response" by the internal protocol. Further, the response message according to the internal protocol includes information on the client ID and the WebSocket Response msg responded by the worker thread 203 in response to the WebSocket msg 1.

Figure 5:
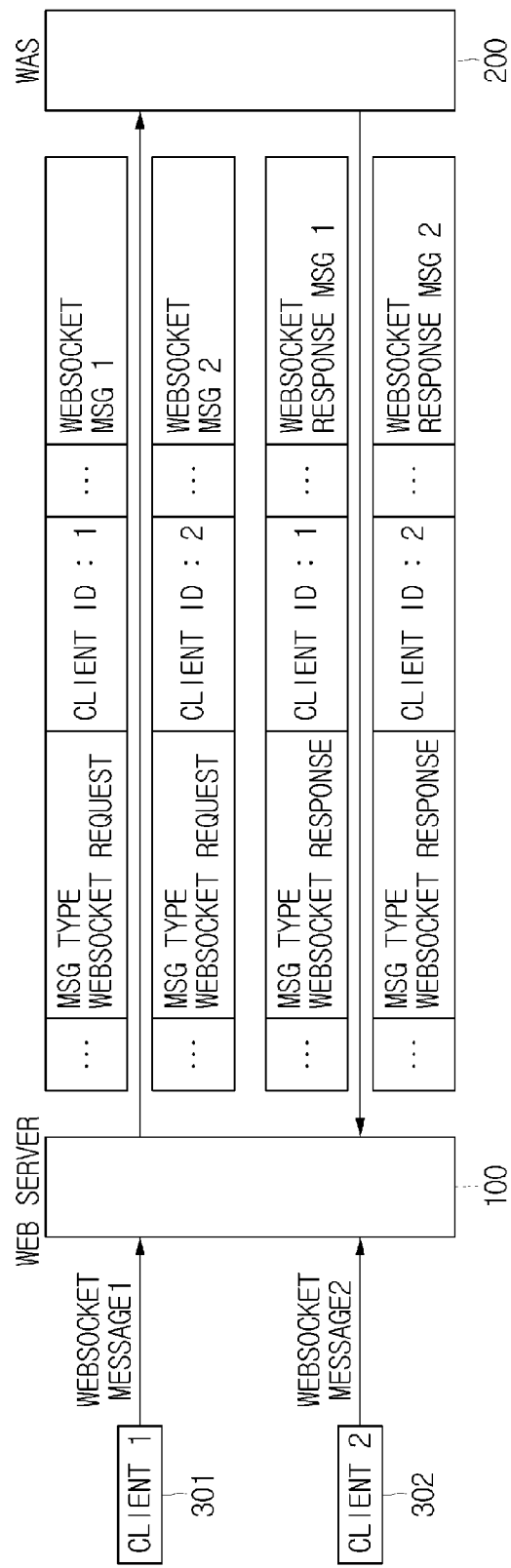
FIG. 5 is a conceptual diagram schematically showing a state of transmitting WebSocket messages in case different clients use the same WebSocket.

FIG. 5 is a conceptual diagram schematically showing a state of transmitting WebSocket messages in case different clients use the same WebSocket.

FIG. 5 discloses a case where the first client 301 and a second client 302 send a first request message and a second request message to the same end point, respectively. Since the WAS 200 knows information on the first client 301 and the second client 302 connected to the application WS1, the WAS 200 may send a first response message for the first request message to the first client 301 and send a second response message for the second request message to the second client 302 even though the first client 301 and the second client 302 use the same specific connection under the same WebSocket.

For example, referring to FIG. 5, if the first client 301 sends the WebSocket message 1, i.e., the first request message, to a specific application and the second client 302 sends the WebSocket message 2, i.e., the second request message, to the same specific application, the web server 100 sends to the WAS 200 via the internal protocol a message including the message type which is "WebSocket Request", the client ID which is "1", and the WebSocket msg 1, and a message including the message type which is "WebSocket Request", the client ID which is "2", and the WebSocket msg 2.

Then, the WAS 200 reply respectively to the web server 100 a message including the message type which is "WebSocket Response", the client ID which is "1", and a WebSocket Response msg corresponding to the WebSocket msg 1, and a message including the message type which is "WebSocket Response", the client ID which is "2", and a WebSocket Response msg corresponding to the WebSocket msg 2.

Figure 6:
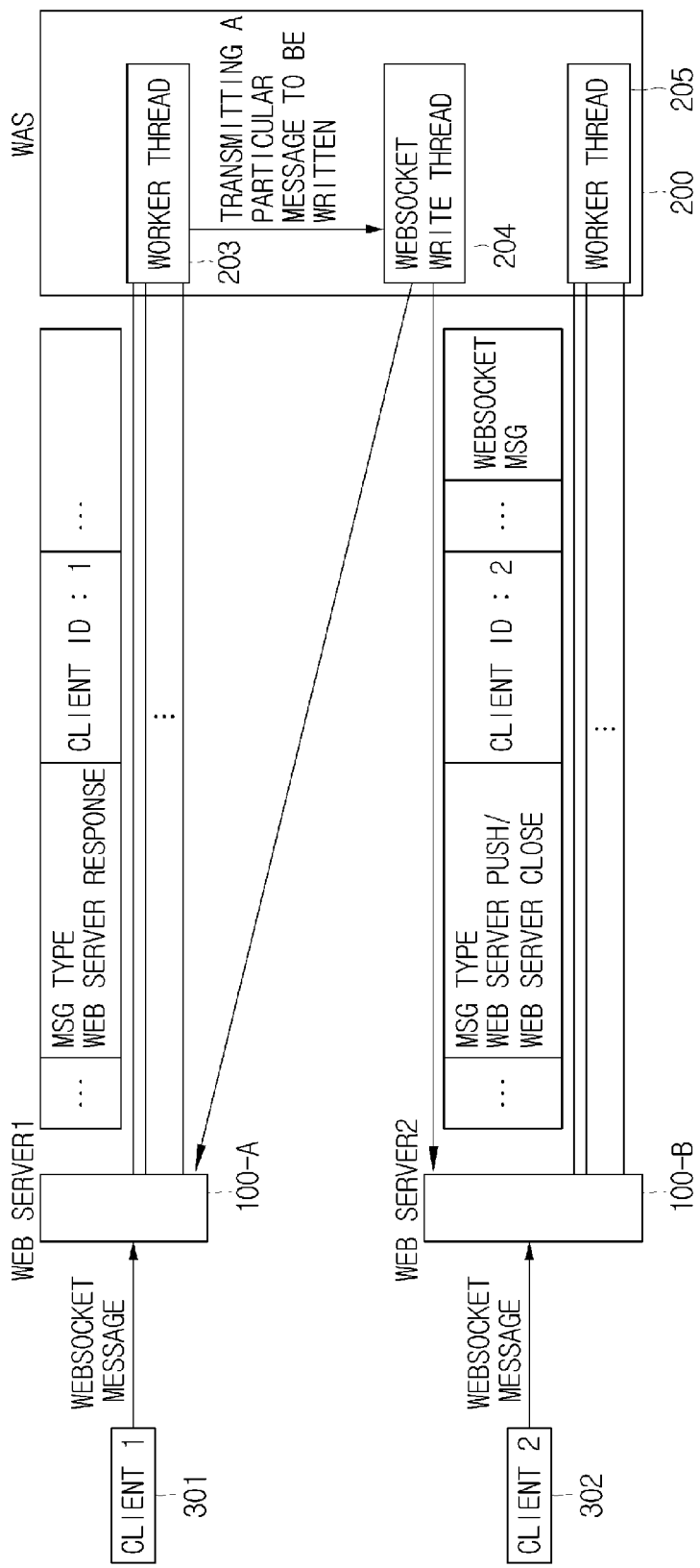
FIG. 6 is a conceptual diagram schematically illustrating a situation in which the WAS processes the request messages from clients in case a plurality of web servers are provided.

FIG. 6 is a conceptual diagram schematically illustrating a situation in which the WAS processes request messages under an environment of multiple web servers being used.

Referring to FIG. 6, web servers 100_A and 100_B receive request messages from the clients 301 and 302. Herein, a first request message as a WebSocket message sent by the first client 301 and a second request message as a WebSocket message sent by the second client 302 may not cause a problem if the clients 301 and 302 send the request messages to different WebSocket end-points. Thus, FIG. 6 provides a case in which the first request message sent by the first client 301 and the second request message sent by the second client 302 are sent to the same WebSocket end-point. Herein, the first web server 100_A receives the first request message from the first client 301 and then forwards it to the WAS 200, and the web server 100_B receives the second request message from the second client 302 and sends it to the WAS 200. In such a case, it is difficult for a specific worker thread 203 of the WAS 200 to send each of response messages to each of the first client 301 and the second client 302. The reason is that the worker thread 203 has no way to directly send messages to the second web server 100_B which is not connected thereto since the worker thread 203 is connected only to the first web server 100_A due to a one-to-one mapping correspondence between each connection and each worker thread.

To solve the difficulty mentioned above, a WebSocket write thread 204 may be provided in the WAS 200 and the WebSocket write thread may be configured to write to all of the web servers 100_A, 100_B connected to the WAS 200.

More specifically, if each of the worker threads 203 and 205 respectively connected to each of the web servers 100_A and 100_B transmit each particular message including response information corresponding to each request message from each of the clients 301 and 302 to the WebSocket write thread 204, the WebSocket write thread 204 distributes each particular message and sends it as each push message to each corresponding web server by referring to each of web server addresses included in each particular message.

To be more specifically, as illustrated in FIG. 6, if the first client 301 sends the first request message as a WebSocket message to the first web server 100_A and the second client 302 sends the second request message as a WebSocket message to the second web server 100_B for the purpose of reaching the identical WebSocket end-point, then the first web server 100_A transmits the first request message to the specific worker thread 203 of the WAS 200 through a first specific connection, and the second web server 100_B transmits the second request message to the specific worker thread 205 of the WAS 200 through a second specific connection. And then, the specific worker threads 203 and 205 sends each particular message including response information for each request message to the WebSocket write thread 204. And then, the WebSocket write thread 204 distributes each particular message and sends it as each push message to each corresponding web server by referring to each of the web server addresses in each particular message.

The push messages sent by the WebSocket write thread 204 may be either "WebSocket Push" or "WebSocket Close" depending on whether a message type of the push messages relate to an actual response or to a connection closing. In addition, the push messages may include information on client ID, i.e., the first client ID or the second client ID, information on WebSocket msg responded by the worker threads 203 and 205.

Furthermore, in order to change the state of the first and the second specific connections, each of the specific worker threads 203 and 205 sends to each web server 100_A or 100_B each response message whose message type is "WebSocket Response" through each of the first and the second specific connections, respectively. That is, upon the WAS 200 transmitting each of the push messages to each web server through the WebSocket write thread 204, each of the specific worker threads 203 and 205 sends a state change message to each of the web servers through each of the first and the second specific connections corresponding to each of the specific worker threads 203 and 205.

If there is a plurality of WASs, the selector of the web server 100 manages the connections with the WASs. In case of different WebSocket connections, it is a matter of course that no problem may arise; and in case of the same WebSocket connections, there is also no problem due to the fact that the selector can adjust and manage the connections.

As may be appreciated by those skilled in the art in the field of the present invention, transmission and reception of such signals such as a request message, a response message and a push message may be performed by the communication units of the web server and the WAS. The data information including the WebSocket information can be held and maintained by the processors or memories of the WAS and the web server. And the selection of a connection among the connections established by the reverse connection scheme or the change of the WebSocket message into the internal protocol message may be mainly performed by the processor of the web server, but it is not limited thereto.

In accordance with the present invention, an effect of eliminating a waste of the number of connections between the web server and the WAS may be achieved by reusing the existing connections established by the reverse connection scheme even if a request from a new client is to be processed.

Also, in accordance with the present invention, another effect of providing an environment in which no context switching is incurred at the WAS may be achieved due to the fact that only the worker mode is performed at the WAS instead of switching between the selector mode and the worker mode alternatively.

Besides, in accordance with the present invention, still another effect of managing connections efficiently between the web server and the WAS may be achieved by a reverse connection scheme with the WebSocket.

In addition, in accordance with the present invention, still yet another effect of effective load balancing may be achieved by selecting the specific connection with the ready state among the existing connections without processing a new request message from a client by applying round robin approach to each WAS in case a new WAS is added due to the overloading of the existing WASs.

The embodiments of the present invention as explained above can be implemented in a fat ii of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the function of the present invention and they can do the same in the opposite case.

As seen above, the present invention has been explained by specific matters such as detailed components, limited embodiments, and drawings. While the invention has been disclosed and illustrated with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A web server, comprising:
a communication unit for receiving or transmitting at least one of: a request message, or a response message corresponding to the request message which has been processed as a WebSocket message, from or to at least one of clients and web application servers (WAS); and
a processor, after finishing a WebSocket upgrade, configured to execute the processes of (a) instructing the communication unit to send to a specific worker thread of the WAS via predetermined internal protocol the request message which has been processed as the WebSocket message by using a specific connection among a plurality of connections established by a reverse connection scheme for interaction between the web server and the WAS, wherein the reverse connection scheme establishes at least one connection between the web server and the WAS by the WAS sending a request to the web server; and of (b) receiving the response message corresponding to the request message from the specific worker thread via the internal protocol by using the specific connection;
wherein the processor is further configured to execute a process of allowing a selector of the web server to select the specific connection capable of transmitting the request message by referring to states of the respective connections established by the reverse connection scheme, and of instructing the communication unit to send the request message to the WAS via the specific connection; and
wherein, if a request for the WebSocket upgrade is received from the at least one of clients or generated by the processor, the communication unit transmits the request for the WebSocket upgrade to the WAS and receives a response for the WebSocket upgrade which includes information on whether or not the request for the WebSocket upgrade has been accepted by the WAS via the specific connection; and if the response for the WebSocket upgrade indicating an acceptance of the request for the WebSocket upgrade is received from the WAS, the processor processes the request message as the WebSocket message.

2. The web server of claim 1, wherein a header of the WebSocket message includes a section including information of a specific client which is communicating with the web server among the clients according to the predetermined internal protocol.

3. The web server of claim 2, A web server, comprising:
a communication unit for receiving or transmitting a request message or a response message corresponding to the request message which has been processed as a WebSocket message from or to at least one of clients and web application servers (WAS); and
a processor, after finishing a WebSocket upgrade, configured to execute the processes of (a) instructing the communication unit to send to a specific worker thread of the WAS via predetermined internal protocol the request message which has been processed as the WebSocket message by using a specific connection among a plurality of connections established by a reverse connection scheme for interaction between the web server and the WAS, wherein the reverse connection scheme establishes at least one connection between the web server and the WAS by the WAS sending a request to the web server; and of (b) receiving the response message corresponding to the request message from the specific worker thread via the internal protocol by using the specific connection;
wherein the processor is further configured to execute a process of allowing a selector of the web server to select the specific connection capable of transmitting the request message by referring to states of the respective connections established by the reverse connection scheme, and of instructing the communication unit to send the request message to the WAS via the specific connection; and
wherein the processor sets a state of the specific connection as ready if the response message corresponding to the request message is sent from the WAS to the web server, and the processor sets the state of the specific connection as run if the response message corresponding to the request message has not yet been sent to the web server.

4. A web server, comprising:
a communication unit for receiving or transmitting a request message or a response message corresponding to the request message which has been processed as a WebSocket message from or to at least one of clients and web application servers (WAS); and
a processor, after finishing a WebSocket upgrade, configured to execute the processes of (a) instructing the communication unit to send to a specific worker thread of the WAS via predetermined internal protocol the request message which has been processed as the WebSocket message by using a specific connection among a plurality of connections established by a reverse connection scheme for interaction between the web server and the WAS, wherein the reverse connection scheme establishes at least one connection between the web server and the WAS by the WAS sending a request to the web server; and of (b) receiving the response message corresponding to the request message from the specific worker thread via the internal protocol by using the specific connection;
wherein, on the condition that (i) the clients include a first client and a second client, (ii) the request message from the first client and that from the second client use an identical WebSocket connection set by the WebSocket upgrade, and (iii) the request messages obtained from the first client and the second client are transmitted to the WAS, the processor receives a first response message to be sent to the first client and a second response message to be sent to the second client as the response message from the WAS via the specific connection by using the communication unit.

5. The web server of claim 1, wherein the internal protocol includes: a message type, a client id, a message length, and a message payload.

6. A web application server (WAS), comprising:
a communication unit for interacting with at least one web server; and
a processor, after finishing a WebSocket upgrade, configured to execute the processes of (a) instructing the communication unit to receive from the web server via predetermined internal protocol a request message, which has been processed as a WebSocket message and which is from at least one of clients, by using at least one specific connection among a plurality of connections established by a reverse connection scheme for interaction between the web server and the WAS, wherein the reverse connection scheme establishes at least one connection between the web server and the WAS by the WAS sending a request to the web server; and of (b) instructing the communication unit to send to the web server via the internal protocol a response message corresponding to the request message, wherein the response message has been processed as a WebSocket message by at least one of specific worker threads of the WAS;

wherein, on the conditions that (i) the clients include a first client and a second client, (ii) the request message from the first client and that from the second client use an identical WebSocket connection set by the WebSocket upgrade, and (iii) the request messages obtained from the first client and the second client are transmitted from the web server, the processor sends a first response message to be sent to the first client and a second response message to be sent to the second client as the response message via the specific connection by using the communication unit.

7. The WAS of claim 6, wherein, if the request for the WebSocket upgrade is received from the web server, the processor determines whether or not a request for the WebSocket upgrade is accepted and instructs the communication unit to deliver via the specific connection a response for the WebSocket upgrade, where the response for the WebSocket upgrade indicates whether or not the request for the WebSocket upgrade is accepted.

8. The WAS of claim 6, wherein, on the conditions that (i) the at least one web server includes a first web server and a second web server, (ii) the communication unit receives a first request message from the first web server as the request message and a second request message from the second web server as the request message, and the first request message and the second request message are respectively transmitted from the different clients, and (iii) the at least one of specific worker threads includes a first specific worker thread and a second specific worker thread and the at least one specific connection includes a first specific connection and a second specific connection, the processor allows each specific worker thread to transmit a particular message including response information corresponding to each request message to a WebSocket write thread in the WAS, and the WebSocket write thread sends the particular message as a push message to each web server having transmitted the request messages.

9. The WAS of claim 8, wherein, in case the processor allows the WebSocket write thread to send the push message to the first and the second web servers, the processor allows the first and the second specific worker threads to send, to the first and the second web servers, a state change message via each of the first and the second specific connections corresponding to each of the first and the second specific worker threads.

10. A method comprising the steps of:
(a) a web server sending to a specific worker thread of a web application server (WAS) via predetermined internal protocol a request message which has been processed as a WebSocket message, if the request message is obtained from at least one of clients after finishing a WebSocket upgrade, by using a specific connection among a plurality of connections established by a reverse connection scheme for interaction between the web server and the WAS, wherein the reverse connection scheme establishes at least one connection between the web server and the WAS by the WAS sending a request to the web server; and
(b) the web server receiving a response message corresponding to the request message from the specific worker thread via the specific connection;
wherein, at the step of (a), the web server allows the selector thereof to select the specific connection capable of transmitting the request message by referring to a state of each connection established by the reverse connection scheme, and sends the request message to the WAS via the specific connection;
before the step of (a):
(a0) the web server receiving a request for the WebSocket upgrade from the at least one of clients or generating the request for the WebSocket upgrade;
(a1) the web server transmitting the request for the WebSocket upgrade to the WAS via the specific connection to perform the WebSocket upgrade; and
(a2) the web server receiving a response with respect to whether or not to accept the request for the WebSocket upgrade from the WAS, thereby completing the WebSocket upgrade.

11. The method of claim 10, wherein a header of the WebSocket message includes a section containing information of the at least one of clients according to the predetermined internal protocol.

12. A method comprising the steps of:
(a) a web server sending to a specific worker thread of the a web application server (WAS) via predetermined internal protocol a request message which has been processed as a WebSocket message, if the request message is obtained from at least one of clients after finishing a WebSocket upgrade, by using a specific connection among a plurality of connections established by a reverse connection scheme for interaction between the web server and the WAS, wherein the reverse connection scheme establishes at least one connection between the web server and the WAS by the WAS sending a request to the web server; and
(b) the web server receiving a response message corresponding to the request message from the specific worker thread via the specific connection;
wherein, at the step of (a), the web server allows the selector thereof to select the specific connection capable of transmitting the request message by referring to a state of each connection established by the reverse connection scheme, and sends the request message to the WAS via the specific connection
wherein the web server sets a state of the specific connection as ready if the response message corresponding to the request message is sent from the WAS to the web server, and sets the state of the specific connection as run if the response message corresponding to the request message has not yet been sent to the web server.

13. A method comprising the steps of:
(a) a web server sending to a specific worker thread of the a web application server (WAS) via predetermined internal protocol a request message which has been processed as a WebSocket message, if the request message is obtained from at least one of clients after finishing a WebSocket upgrade, by using a specific connection among a plurality of connections established by a reverse connection scheme for interaction between the web server and the WAS, wherein the reverse connection scheme establishes at least one connection between the web server and the WAS by the WAS sending a request to the web server; and (b) the web server receiving a response message corresponding to the request message from the specific worker thread via the specific connection;

wherein, on the conditions that (i) the clients include a first client and a second client, (ii) the request message from the first client and that from the second client use an identical WebSocket connection set by the WebSocket upgrade, and (iii) the request messages obtained from the first client and the second client are transmitted to the WAS, at the step of (b), the web server receives from the WAS a first response message to be sent to the first client and a second response message to be sent to the second client as the response message via the specific connection.

14. A method comprising the steps of:
(a) a web application server (WAS), after finishing a WebSocket upgrade, receiving from at least one web server via predetermined internal protocol a request message which has been processed as a WebSocket message in the web server by using at least one specific connection among a plurality of connections established by a reverse connection scheme for interaction between the web server and the WAS, on the condition that the web server have received the request message from at least one of clients, wherein the reverse connection scheme establishes at least one connection between the web server and the WAS by the WAS sending a request to the web server; and (b) the WAS sending to the web server via the internal protocol a response message corresponding to the request message, wherein the response message has been processed as a WebSocket message by at least one of specific worker threads thereof;

wherein, on the conditions that (i) the at least one web server includes a first web server and a second web server, (ii) the WAS receives a first request message from the first web server as the request message and a second request message from the second web server as the request message, and the first request message and the second request message are respectively transmitted from the different clients, and (iii) the at least one of specific worker threads includes a first specific worker thread and a second specific worker thread and the at least one specific connection includes a first specific connection and a second specific connection, at the step of (b), the WAS allows each specific worker thread to transmit a particular message including response information corresponding to each request message to a WebSocket write thread in the WAS, and the WebSocket write thread sends the particular message as a push message to each web server having transmitted the request message.

15. The method of claim 14, at the step of (b), wherein, in case the WAS allows the WebSocket write thread to send the push message to the first and the second web servers, the WAS allows the first and the second specific worker threads to send, to the first and the second web servers, a state change message via each of the first and the second specific connections corresponding to each of the first and the second specific worker threads.

* * * * *